United States Patent Office 3,325,270
Patented June 13, 1967

3,325,270
PHYTOTOXIC COMPOSITIONS AND METHOD OF USE
John F. Olin, Ballwin, Mo., assignor to Monsanto Company, St. Louis, Mo., a corporation of Delaware
No Drawing. Original application Sept. 18, 1964, Ser. No. 397,636, now Patent No. 3,255,247, dated June 7, 1966. Divided and this application Mar. 21, 1966, Ser. No. 535,731
14 Claims. (Cl. 71—2.3)

This application is a division of copending application Ser. No. 397,636, filed Sept. 18, 1964, now U.S. Patent No. 3,255,247, which in turn is a continuation-in-part of application Ser. No. 134,167, filed Aug. 28, 1961, now abandoned.

This invention relates to phytotoxic compositions and to methods of controlling or modifying the growth of plant.

The terms "phytotoxic" and "phytotoxicity" are used herein to identify the plant growth modifying activity of the compounds useful in the compositions and methods of this invention. Such modifying activity includes all deviations from natural development, for example, killing, retardation, defoliation, desiccation, regulation, stunting, tillering, stimulation, dwarfing and the like. In like manner, the term "phytotoxicant" is used to mean materials which exhibit the above growth modifying activity.

The term "plant" as used herein and in the appended claims means germinant seeds, emerging seedlings and established vegetation including the roots and above ground portions.

In accordance with this invention, it has been found that the growth of germinant seeds, emerging seedlings and established vegetation can be controlled or modified by a method which comprises exposing the seeds, emerging seedlings or the roots or above ground portions of established vegetation to an effective amount of one or more α-halo-N-naphthylacetamides of the formula.

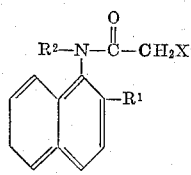

wherein $R^1$ is tertiary alkyl having at least 4 and not more than 10 carbon atoms, $R^2$ is selected from the group consisting of hydrogen, alkyl of not more than 6 carbon atoms and alkenyl of not more than 6 carbon atoms and X is halogen (Cl, Br and I). The tertiary alkyl of $R^1$ in the above formula can be, for example, tert-butyl, tert-amyl, 1,1,2-trimethylpropyl, 1,1-dimethylbutyl, 1,1-dimethylamyl, 1,1,2 -trimethylbutyl, 1,1,3 - trimethylbutyl, 1,1,3,3 - tetramethylbutyl, 1,1,2,3 - tetramethylbutyl, 1,1,2,2 - tetramethylbutyl, 1,1 - dimethyloctyl and the like. In the above formula $R^2$ can be hydrogen, alkyl such as ethyl, isopropyl, n-butyl, sec-butyl, tert-butyl, n-amyl and n-hexyl, and alkenyl such as allyl, vinyl, crotyl and methallyl.

The α-haloacetamides of the above formula are effective as general phytotoxicants including post-emergent phytotoxicants and pre-emergent phytotoxicants, but their most outstanding utility is as pre-emergent phytotoxicants. Furthermore, these compounds are characterized by a broad spectrum of herbicidal or phytotoxic activity, i.e. they modify the growth of a wide variety of plant including both monocotyledonous and dicotyledonous plants. For the sake of brevity and simplicity, the term "active ingredients" will be used hereinafter in this specification to describe the α-haloacetamide phytotoxicants of the above formula.

In practicing the phytotoxic or herbicidal methods of this invention the active ingredients can be used alone or in combination with a material referred to in the art as a phytotoxic adjuvant in liquid or solid form. The phytotoxic compositions of this invention are prepared by admixing the active ingredient with an adjuvant including diluents, extenders, carriers and conditioning agents to provide compositions in the form of finely-divided particulate solids, granules, pellets, solutions and aqueous dispersions or emulsions. Thus the active ingredient can be used with an adjuvant such as a finely-divided particulate solid, a solvent liquid of organic origin, water, a wetting agent, dispersing agent, an emulsifying agent or any suitable combination of these.

The term "phytotoxic composition" as used herein and in the appended claims is intended to mean not only compositions in a suitable form for application but also concentrated compositions which require dilution or extension with a suitable quantity of liquid or solid adjuvant prior to application.

The α-haloacetanilides used in the compositions and methods of this invention and detailed processes for preparing them are disclosed and claimed in copending application Ser. No. 397,636, filed Sept. 18, 1964. In general they are prepared by haloacetylation of suitable naphthylamines, which can be prepared for example, by the process disclosed in application S.N. 852,632, filed Nov. 13, 1959 from a naphthylamine and a branch-chain olefin. The haloacetylating agent is preferably either a haloacetic anhydride, such as chloroacetic anhydride, or a haloacetyl halide, such as chloroacetyl chloride, bromoacetyl bromide, or the like.

The haloacetylation reaction is preferably conducted in the presence of a suitable inert liquid reaction medium. The liquid reaction medium must be substantially anhydrous if the acetylating agent is a haloacetic anhydride. However, either anhydrous media or media containing water can be used with haloacetyl halide acetylating agents. Suitable reaction media for use with either acetylating agent include, for example, benzene, diethyl ether, hexane, methylethyl ketone, chlorobenzene, toluene, chloroform, and the xylenes. It is preferred that an acid acceptor be present in the reaction zone to neutralize the acid formed. Suitable acid acceptors for anhydrous systems include the naphthylamine reactants, which can be present in the reaction zone in an amount greater than that required for the acetylation, tertiary amines, and pyridine. Acid acceptors in aqueous systems include alkali metal or alkaline earth metal hydroxides, carbonates and bicarbonates. The haloacetylation reaction is generally carried out at a temperature below room temperature, preferably in the range from about 0° C. to about 15° C.

As an example, N-(2-tert-butyl-1-naphthyl)-2-chloroacetamide is prepared by reacting 40 g. (0.2 mole) of 2-tert-butyl-1-naphthylamine dissolved in 100 ml. of benzene with 0.22 mole of chloroacetic anhydride in chloroform. Although the reaction is moderately exothermic, the reaction mixture is heated on a hot plate for an additional 10 minutes. At the end of this time, 150 ml. of water is added to the reaction mixture and the organic solids removed by wet distillation. After standing overnight, the solid material in the reaction mixture is separated and crystallized from dilute methanol to obtain 34 g. of N-(2-tert-butyl-1-naphthyl)-2-chloroacetamide which is a colorless solid having a melting point of 181–182° C. The other α-haloacetamides used in the compositions and methods of this invention are prepared in a similar manner.

The following examples will illustrate the invention. In these examples, as well as in the specification and appended claims, parts and percent are by weight unless otherwise indicated.

Example 1

The pre-emergent phytotoxic ratings of representative substituted α-halo-N-naphthylacetamides of this invention are determined in greenhouse tests in which a specific number of seeds of 12 different plants, each representing a principal botanical type, are planted in greenhouse flats. A good grade of top soil is placed in either 9½″ x 5¾″ x 2¾″ or 9″ x 13″ x 2″ aluminum pans and compacted to a depth of ⅜ inch from the top of the pan. On top of the soil are placed five seeds of each of radish, morning glory, and tomato; 10 seeds of each of sugar beet, sorghum, and brome grass; 20 seeds of each of wild buckwheat, giant foxtail, rye grass, and wild oat; approximately 20 to 30 (a volume measure) of each of pigweed and crab grass; and either 2 or 3 seeds of soybean. Two different type plantings are made; one wherein the phytotoxic composition is applied to the surface of the soil and the other wherein the composition is admixed with or incorporated in the top layer of soil. In the surface-application plantings, the seeds are arranged with 3 soybean seeds across the center of the large aluminum pan, the monocatyledon or grass seeds scattered randomly over one-third of the soil surface, and the dicotyledon or broadleaf seeds scattered randomly over the remaining one-third of the soil surface at the other end of the pan. The seeds are then covered with ⅜ inch of prepared soil mixture and the pan leveled. In the soil-incorporation plantings, 450 g. of prepared soil mixture is blended with the phytotoxic composition in a separate mixing container for covering the seeds which are planted in the smaller of the two aluminum pans. The seeds in this planting are arranged with a soybean seed planted in diagonal corners and the monocotyledon seeds and the dicotyledon seeds each scattered randomly over one-half of the soil surface. The phytotoxicant-incorporated soil mixture is used to cover the seeds. The phytotoxic composition is applied in the surface-application plantings prior to the watering of the seeds. This application of the phytotoxic composition is made by spraying the surface of the soil with an acetone solution containing a sufficient quantity of the active ingredient to obtain the desired rate per acre on the soil surface. The watering of the seeds in both type plantings is accomplished by placing the aluminum pans in a sand bench having ½-inch depth of water thereon and permitting the soil in the pans to absorb moisture through the perforated bottom of the pans.

The pans are placed on a wet sand bench in a greenhouse and maintained for 14 days under ordinary conditions of sunlight and watering. At the end of this time, the plants are observed and the results recorded by counting the number of plants of each species which germinated and grew. The phytotoxic activities index is based on the average percent germination of each seed lot. The activity index is converted to a relative numerical scale for the sake of brevity and simplicity in the presentation of data.

The pre-emergent phytotoxic activity index used in this example is defined as follows:

| Average Percent Germination | Numerical Scale | Phytotoxic Activity |
|---|---|---|
| 76 to 100 | 0 | No phytotoxicity. |
| 51 to 75 | 1 | Slight phytotoxicity. |
| 26 to 50 | 2 | Moderate phytotoxicity. |
| 0 to 25 | 3 | Severe phytotoxicity. |

The pre-emergent phytotoxic activity of representative substituted α-halo-N-naphthylacetamides is recorded in Table I for various application rates of the α-haloacetamide in both surface and soil-incorporated applications. In Table I, the various seeds are represented by letters as follows:

A—General grass
B—General broadleaf
C—Morning Glory
D—Wild oats
E—Brome grass
F—Rye grass
G—Radish
H—Sugar beet
I—Foxtail
J—Crab grass
K—Pigweed
L—Soybean
M—Wild buckwheat
N—Tomato
O—Sorghum Individual phytotoxic ratings for each plant type are reported in Table I. In addition, the total phytotoxic rating for all grass plants and the total injury for all broadleaf plants are also reported in Table I. For grasses, the maximum total is 18 for the 6 grass plants at ratings of 3. For broadleafs, the maximum total is 21 for the 7 broadleaf plants at ratings of 3.

TABLE I.—PRE-EMERGENT PHYTOTOXIC ACTIVITY OF SUBSTITUTED A-HALO-N-NAPHTHYLACETAMIDES

| Compound | Rate, lb./Acre | Plant | | | | | | | | | | | | | | | Total Phytotoxic Rating | | Comments |
|---|---|---|---|---|---|---|---|---|---|---|---|---|---|---|---|---|---|---|---|
| | | A | B | C | D | E | F | G | H | I | J | K | L | M | N | O | Grass | Broadleaf | |
| N-(2-tert-butyl-1-naphthyl)-2-chloroacetamide | 5 | 3 | 0 | 1 | 2 | 2 | 3 | 0 | 0 | 3 | 3 | 2 | ---- | 0 | 1 | 3 | 16 | *4 | (¹) |
| | 0.25 | 2 | 0 | 0 | 0 | 0 | 3 | 0 | 0 | 3 | 3 | 2 | ---- | 0 | 0 | 1 | 10 | *2 | (¹) |
| | 0.15 | 2 | 0 | 0 | 0 | 2 | 2 | 0 | 0 | 3 | 3 | 2 | 0 | 0 | 0 | 0 | 10 | 2 | (²) |
| 2-bromo-N-(2-tert-butyl-1-naphthyl)acetamide | 5 | 2 | 0 | 0 | 0 | 0 | 3 | 0 | 1 | 3 | 3 | 1 | 0 | 0 | 2 | 3 | 12 | 4 | (¹) |
| N-allyl-N-(2-tert-butyl-1-naphthyl)-2-chloroacetamide | 5 | 3 | 1 | 0 | 2 | 1 | 2 | 0 | 2 | 3 | 3 | 3 | 0 | 0 | 3 | 3 | 14 | 8 | (¹) |
| | 1 | 2 | 0 | 0 | 0 | 0 | 3 | 0 | 0 | 3 | 3 | 0 | 0 | 0 | 0 | 2 | 11 | 0 | (²) |
| N-allyl-2-bromo-N-(2-tert-butyl-1-naphthyl)acetamide | 5 | 3 | 0 | 0 | 0 | 2 | 3 | 0 | 0 | 3 | 3 | 3 | 0 | 0 | 2 | 3 | 14 | 5 | (¹) |
| | 1 | 3 | 0 | 0 | 0 | 2 | 2 | 3 | 0 | 0 | 3 | 3 | 2 | 0 | 0 | 0 | 3 | 16 | 2 | (²) |

*One species missing.
¹ Surface application.
² Incorporated in soil.

The data in Table I illustrate the general phytotoxic activity as well as the selective phytotoxic activity of representative substituted α-halo-N-naphthylacetamides useful in the compositions and methods of this invention. It will be noted that haloacetamides substituted with a naphthyl group on the amide nitrogen atom demonstrate very outstanding general phytotoxic activity at low rates of application. Thus, these α-haloacetamides are particularly useful in soil sterilization applications. It will also be noted from the data in Table I that unusual grass specificity can be obtained at lower levels of application. Such grass specificity is achieved at extremely low application rates, for example, at rates as low as 0.15 lb. per acre with N-(2-tert-butyl-1-naphthyl)-2-chloroacetamide, so that very economical treatment is possible. The three botanical types or genera of grasses effectively controlled by the substituted α-halo-N-naphthylacetamides of this invention embrace a large number of plants frequently found in vegetable crops. But these α-halo-acetamides are not limited to removing grasses from broadleaf plants, since the selective action is such that certain genera of grasses can be removed from corn, which is also a genus of grass. The α-haloacetamides are also effective in killing nut grass, i.e., *Cyperus rotundus* and *Cyperus esculentus*.

*Example 2*

The post-emergent phytotoxic activity of representative α-haloacetamides is determined in greenhouse tests. The α-haloacetamide to be tested is applied in spray form to 21-day old specimens of the same grasses and broadleaf plants as used in the pre-emergent tests described above. The same number of seeds of the same plants used in the pre-emergent tests are planted in the 9½" x 5¾" x 2¾" aluminum pans arranged in the same manner with a soybean seed in diagonal corners as described above. After the plants were 21-days old, each aluminum pan is sprayed with 6 ml. of a 0.5% concentration solution of the active ingredient, corresponding to a rate of approximately 9 lbs. per acre. This phytotoxic solution is prepared from 1.5 ml. of a 2% solution of the active ingredient in acetone, 0.2 ml. of a 3:1 cyclohexanone-emulsifying agent mix, and sufficient water to make a volume of 6 ml. The emulsifying agent was a mixture comprising 35 wt. percent butylamine dodecylbenzene sulfonate and 65 wt. percent of a tall oil-ethylene oxide condensate having about 6 moles of ethylene oxide per mole of tall oil. The injuries to the plants are observed 14 days later. A general grass phytotoxic activity of 3 and a general broadleaf phytotoxic activity of 3 are obtained for N-(2-tert-butyl-1-naphthyl)-2-chloroacetamide.

As demonstrated in the examples above, quite different effects can be obtained by modifying the method of use of the phytotoxic compositions of this invention. Thus, unusual grass specificity can be achieved at lower levels of application whereas at higher levels of application a more general phytotoxic effect or soil sterilization takes place. Therefore, an essential part of this invention is the formulation of the phytotoxic compositions that permit a uniform predetermined application of the active ingredient to the soil or plant system to produce the desired effect.

In general, the α-haloacetamides useful in the compositions and methods of this invention are insoluble in water and somewhat soluble in many organic solvents. The active ingredient need not be dissolved in the extending agent but may merely be dispersed or suspended therein as a suspension or emulsion. Also, the α-haloacetamides may first be dissolved in a suitable organic solvent and the organic solution of the active ingredient then incorporated in water or an aqueous extending agent to form a heterogeneous dispersion. Examples of some suitable organic solvents for use as extending agents include hexane, benzene, toluene, acetone, cyclohexanone, methylethylketone, isopropanol, butanediol, methanol, diacetone alcohol, xylene, dioxane, isopropyl ether, ethylene dichloride, tetrachloroethane, hydrogenated naphthalene, solvent naphtha, petroleum fractions (e.g., those boiling almost entirely under 400° F. at atmospheric pressure and having flash points above about 80° F., particularly kerosene), and the like. Where true solutions are desired, mixtures of organic solvents have been found to be useful, for example, 1:1 and 1:2 mixtures of xylene and cyclohexanone.

Solid adjuvants in the form of particulate solids are very useful in the practice of the present invention because of the low solubility properties of the α-haloacetamides. In using this type of adjuvant, the active ingredient is either adsorbed or dispersed on or in the finely divided solid material. Preferably the solid materials are not hygroscopic but are materials which render the composition permanently dry and free flowing. Suitable particulate solids include the natural clays, such as china clays, the bentonites and the attapulgites; other minerals in natural state, such as talc, pyrophyillite, illitic clay, quartz, diatomaceous earth, fuller's earth, chalk, rock phosphate, kaolin, kieselguhr, volcanic ash, salt, and sulfur; the chemically modified minerals, such as acid-washed bentonite, precipitated calcium phosphate, precipitated calcium carbonate, calcined magnesia, and colloidal silica; and other solid materials such as charcoals, powdered cork, powdered wood, and powdered pecan or walnut shells. These materials are used in finely-divided form, at least in a size range of 20–40 mesh and preferably in much finer size.

The surface active agent, that is, the wetting, emulsifying, or dispersion agent, used in the phytotoxic compositions of this inveniton to serve in providing uniform dispersions of all formulation components in both liquid and particulate solid form can be anionic, cationic, nonionic, or mixtures thereof. Suitable surface active agents are the organic surface active agents capable of lowering the surface tension of water and include the conventional soaps, such as the water-soluble salts of long-chain carboxylic acids; the amino soaps, such as the amine salts of long-chain carboxylic acids; the sulfonated animal, vegetable, and mineral oils; quaternary salts of high molecular weight acids; rosin soaps, such as salts of abietic acid; sulfuric acid salts of high molecular weight organic compounds; algin soaps; ethylene oxide condensated with fatty acids, alkyl phenols and mercaptans; and other simple and polymeric compositions having both hydrophilic and hydrophobic functions.

The liquid phytotoxic compositions of this invention preferably comprise 0.01% to 99% by weight of the active ingredient with the remainder being phytotoxic adjuvant which can be liquid extending agent or surface active agent (including adjesive agent), but preferably is an admixture thereof. Preferably, the surface active agent comprises from 0.1% to 15% by weight of the total composition. The remainder of the composition is the liquid extending agent.

The concentration of active ingredient in the particulate solid or dust compositions of this invention can vary over wide ranges depending upon the nature of the solid adjuvant and the intended use of the composition. Since the active ingredients of this invention have very high toxicities and are usually applied at very low rates in order to obtain selectivity, the concentration of the active ingredient in the dust composition can be very low and may comprise as little as 1% or less by weight of the total dust composition. By contrast, when the dust composition is to be used for soil sterilization, it may be desirable to have a very high concentration of active ingredient and for such use the active ingredient can comprise as much as 5% to 99% by weight of the total composition. The remainder of the composition is the phytotoxic adjuvant which is usually only the particulate solid extending agent. Thus, a surface active agent is not usually required in dust compositions although they can be used if desired. However, if the particulate solid compositions are to be applied as a wettable powder, a surface active agent must be added. Ordinarily the amount of surface active agent will be in the range of 0.1% to 15% by weight of the phytotoxic composition.

The phytotoxic compositions of this invention can also contain other additaments, for example fertilizers, pesticides and the like, used as adjuvant or in combination with any of the above-described adjuvants. Phytotoxicants useful in combination with the above-described compounds include for example 2,4-di-chlorophenoxyacetic acid, 2,4,5-trichlorophenoxyacetic acid, 2-methyl-4-chlorophenoxyacetic acid and the salts, esters and amides thereof; triazine derivatives such as 2,4-bis(3-methoxy-propylamino) - 6-methylthio-S-triazine, 2-chloro-4-ethylamino-6-isopropylamino-S-triazine, and 2-ethylamino-4-isopropylamino-6-methylmercapto-S-triazine; urea derivatives such as 3-(3,4-dichlorophenyl) - 1,1 - dimethyl urea and 3-(p- chlorophenyl)-1,1-dimethyl urea, and acetamides such as N,N-diallyl-α-chloroacetamide, N-(α-chloroacetyl)hexamethylene imine, and N,N-diethyl-α-bromoacetamide, and the like. Fertilizers useful in combination with the active ingredients include for example ammonium nitrate, urea and superphosphate. Other useful additaments include materials in which plant organisms take root and grow such as compost, manure, humus, sand and the like.

The phytotoxic compositions of this invention are applied to the plant in the conventional manner. Thus, the dust and liquid compositions can be applied to the plant system by the use of power-dusters, boom and hand sprayers and spray-dusters. The compositions can also be applied from airplane as a dust or a spray because they are effective in very low dosages. In order to modify or control growth of germinating seeds or emerging seedlings, the dust and liquid compositions are applied to the soil according to conventional methods and are preferably distributed in the soil to a depth of at least ½-inch below the soil surface. It is not necessary that the phytotoxic compositions be admixed with the soil particles and these compositions can be applied merely by spraying or sprinkling the surface of the soil. The phytotoxic compositions of this invention can also be applied by addition to irrigation water supplied to the field to be treated. This method of application permits the penetration of the compositions into the soil as the water is absorbed therein. Dust compositions sprinkled on the surface of the soil can be distributed below the surface of the soil by conventional means such as discing, dragging or mixing operations.

The application of an effective amount of active ingredient to the plant is essential in the practice of the present invention. The exact dosage to be applied is dependent not only upon the specific α-haloacetamide but also upon the particular plant species to be controlled and the stage of growth thereof as well as the part of the plant to be contacted with the toxicant. In non-selective foliage treatments, the phytotoxic compositions of this invention are usually applied at a range sufficient to obtain from 5 to 50 lbs. of α-halo-acetamide per acre but lower or higher rates might be applied in some cases. In non-selective pre-emergent treatments, the phytotoxic compositions are usually applied at a somewhat lower rate than in foliage treatments but at a rate which is ordinarily within the same general range, that is at a rate in the range of 1 to 25 lbs. per acre. However, because of the unusually high unit activity possessed by the α-haloacetamides useful in the compositions and methods of this invention, soil sterilization is ordinarily accomplished at a rate of application in the range of 3–9 lbs. per acre. In selective pre-emergent applications to the soil, a dosage of from 0.05 to 5 lbs. of active ingredient per acre is usually employed but lower or higher rates may be necessary in some instances. It is believed that one skilled in the art can readily determine from this disclosure, including the examples, the optimum rate to be applied in any particular case.

The terms "soil" and "growth media" are employed in the present specification and claims in their broadest sense to be inclusive of all conventional "soils" as defined in Webster's New International Dictionary, Second edition, Unabridged (1961). Thus, the terms refer to any substance or media in which vegetation may take root and grow, and are intended to include not only earth but compost, manure, muck, humus, sand and the like, adapted to support plant growth.

The embodiments of the invention in which an exclusive property or privilege is claimed are defined as follows:

1. Method which comprises contacting a plant with a phytotoxic amount of an α-haloacetamide of the formula

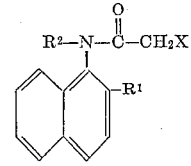

wherein $R^1$ is tertiary alkyl of at least 4 and not more than 7 carbon atoms, $R^2$ is selected from the group consisting of H, alkyl of not more than 6 carbon atoms and alkenyl of not more than 6 carbon atoms and X is selected from the group consisting of Cl, Br and I.

2. Method of claim 1 wherein the α-haloacetamide is N-(2-tert-butyl-1-naphthyl)-2-chloroacetamide.

3. Method of claim 1 wherein the α-haloacetamide is N-(2-tert-butyl-1-naphthyl)-2-bromoacetamide.

4. Method of claim 1 wherein the α-haloacetamide is N-(allyl)-N-(2-tert-butyl-1-naphthyl)-2-chloroacetamide.

5. Method of claim 1 wherein the α-haloacetamide is N-(allyl)-N-(2-tert-butyl-1-naphthyl)-2-bromoacetamide.

6. Composition comprising as an essential active ingredient a phytotoxic amount of an α-haloacetamide of the formula

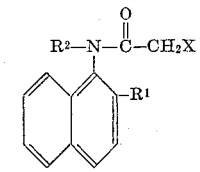

wherein $R^1$ is tertiary alkyl of at least 4 and not more than 7 carbon atoms, $R^2$ is selected from the group consisting of H, alkyl of not more than 6 carbon atoms and alkenyl of not more than 6 carbon atoms and X is selected from the group consisting of Cl, Br and I.

7. Composition of claim 6 wherein $R^2$ is hydrogen.

8. Composition of claim 6 wherein $R^2$ is alkenyl.

9. Composition of claim 6 wherein $R^2$ is alkyl.

10. Composition of claim 6 wherein $R^1$ is tert-butyl.

11. Composition of claim 6 wherein the α-haloacetamide is N-(2-tert-butyl-1-naphthyl)-2-chloroacetamide.

12. Composition of claim 6 wherein the α-haloacetamide is N-(2-tert-butyl-1-naphthyl)-2-bromoacetamide.

13. Composition of claim 6 wherein the α-haloacetamide is N-(allyl)-N-(2-tert-butyl-1-naphthyl)-2-chloroacetamide.

14. Composition of claim 6 wherein the α-haloacetamide is N-(allyl)-N-(2-tert-butyl-1-naphthyl)-2-bromoacetamide.

References Cited

UNITED STATES PATENTS

| 2,412,510 | 12/1946 | Jones | 71—2.6 |
| 2,863,752 | 12/1958 | Hamme et al. | 71—2.3 |

FOREIGN PATENTS

| 1,062,250 | 6/1959 | Germany. |

OTHER REFERENCES

Leonard et al.: J. of Bacteriology, vol. 57, pages 339 to 347.

LEWIS GOTTS, *Primary Examiner.*

JAMES O. THOMAS, JR., *Examiner.*